United States Patent
Bremond et al.

(10) Patent No.: US 6,850,400 B2
(45) Date of Patent: Feb. 1, 2005

(54) CIRCUIT FOR PROTECTION AGAINST HEATING OF A PROTECTION ELEMENT OF EQUIPMENT

(75) Inventors: André Bremond, Veretz (FR); Philippe Merceron, Vernon/Brenne (FR)

(73) Assignee: STMicroelectronics S.A., Montrouge (FR)

( * ) Notice: Subject to any disclaimer, the term of this patent is extended or adjusted under 35 U.S.C. 154(b) by 159 days.

(21) Appl. No.: 09/863,811

(22) Filed: May 22, 2001

(65) Prior Publication Data

US 2002/0018330 A1 Feb. 14, 2002

(30) Foreign Application Priority Data

May 23, 2000 (FR) .............................. 00 06573

(51) Int. Cl.[7] .............................................. H02H 5/00
(52) U.S. Cl. ..................................... 361/103; 361/119
(58) Field of Search ........................ 361/54, 56, 93.1, 361/103, 104, 111, 119, 115, 49

(56) References Cited

U.S. PATENT DOCUMENTS

| | | | | |
|---|---|---|---|---|
| 3,708,720 A | | 1/1973 | Whitney et al. | |
| RE30,514 E | * | 2/1981 | Hyink et al. | 361/103 |
| 4,432,029 A | * | 2/1984 | Lundqvist | 361/16 |
| 4,829,390 A | * | 5/1989 | Simon | 361/49 |
| 5,247,273 A | * | 9/1993 | Shibayama et al. | 337/16 |
| 5,299,088 A | * | 3/1994 | Honl et al. | 361/119 |
| 5,379,176 A | * | 1/1995 | Bacon et al. | 361/106 |
| 5,864,458 A | * | 1/1999 | Duffy et al. | 361/93.9 |
| 5,966,281 A | * | 10/1999 | Larson | 361/103 |
| 6,141,193 A | * | 10/2000 | Mercer | 361/18 |
| 6,157,529 A | * | 12/2000 | Ahuja | 361/111 |
| 6,178,080 B1 | * | 1/2001 | Wilken et al. | 361/119 |
| 6,300,750 B1 | * | 10/2001 | Oglesbee et al. | 323/282 |
| 6,407,901 B1 | * | 6/2002 | Casey et al. | 361/119 |
| 6,600,641 B2 | * | 7/2003 | Oglesbee et al. | 361/103 |
| 2002/0027758 A1 | * | 3/2002 | Oglesbee et al. | 361/104 |
| 2002/0097545 A1 | * | 7/2002 | Wood | 361/93.9 |

FOREIGN PATENT DOCUMENTS

| | | |
|---|---|---|
| EP | 0 716 494 A1 | 6/1996 |
| FR | 2 519 480 | 7/1983 |

* cited by examiner

*Primary Examiner*—Jonathan Salata
(74) *Attorney, Agent, or Firm*—Lisa K. Jorgenson; Robert Iannucci; Seed IP Law Group PLLC

(57) ABSTRACT

A series device for protection against a heating of a parallel protection element of an equipment of a telephone line, including a bi-directional cut-off element, of normally on state and placed in series with the parallel protection element, a temperature detection element, and a switching element adapted to turning off the cut-off element when the temperature detected by the detection element exceeds a predetermined threshold.

19 Claims, 3 Drawing Sheets

CIRCUIT FOR PROTECTION AGAINST HEATING OF A PROTECTION ELEMENT OF EQUIPMENT

TECHNICAL FIELD

The present invention relates to the protection of a load receiving electric signals from a line likely to undergo disturbances, be it exclusively a power transmission line, exclusively a data transmission line, or a data and power transmission line. The present invention more specifically relates to the protection of a load against overvoltages resulting from disturbances likely to be carried by a conductive line connected thereto.

BACKGROUND OF THE INVENTION

Protection devices of this type are found, in particular, in telecommunication networks where conductive lines connect subscribers to collective equipment of telephone exchange type. In such a network, the line connecting the subscriber to the exchange center may be mainly submitted to two types of disturbances resulting in overvoltages. A first type of disturbances, called short disturbances, relates to atmospheric phenomena such as lightning which is likely to hit overhead telephone lines. Overvoltages of atmospheric type are relatively short (a few hundreds of microseconds) with a strong current (a few tens of amperes). A second type of disturbances, called lasting disturbances, relates to risks for the line of conveying a current coming from the power supply system (the mains at 50 or 60 Hz). These disturbances may come from a direct contact with the mains, or from induction phenomena if the low-voltage telephone line is placed close to a high-voltage mains conductor. Overvoltage of mains type are relatively long (likely to reach several minutes) and are also likely to reach RMS currents of a few tens of amperes.

The equipment connected to telephone lines (subscriber station or telephone exchange) are usually provided with protection devices aiming at avoiding their destruction upon occurrence of such overvoltages.

FIG. 1 very schematically shows a conventional example of a device for protecting a user equipment (UE) 1, for example a telephone subscriber station. This device is divided into a protection device (PTC) 2 of series type and a protection device 3 of parallel type. The series protection device is connected between a first conductor T of the telephone line and a terminal 4 of access to the user equipment, as close as possible to this equipment. Parallel protection device 3 is connected between input terminals 4 and 5 of user equipment 1, terminal 5 being, for a user equipment, directly connected to a second conductor R of the telephone line.

Parallel protection device 3 mainly has the function of ensuring the protection against disturbances of atmospheric type, that is, of short duration. Its function is to pull the line current in the presence of an overvoltage. Parallel protection device 3 is most often formed of a brick-over component of bi-directional Schockley diode type. Such a component is known under trade name Trisil and has a current-vs.-voltage characteristic of the type illustrated in FIG. 2. This device appears as an open circuit as long as voltage V thereacross does not reach a threshold value Vb0, whatever its biasing. When this threshold voltage is reached, device 3 becomes a short-circuit enabling passing of a current I, thus clipping the voltage across the load. The opening back of device 3 is performed when the current flowing therethrough becomes lower than a hold current Ih.

Such a device is well adapted to the protection against overvoltages of short duration but is not capable of dissipating power for a duration on the order of several minutes. It is therefore associated with series protection device 2. Device 2 operates as a positive temperature coefficient resistor, that is, the higher the current flowing therethrough, the more the device heats up and the more its resistance increases. Device 2 may be sized so that from a given current threshold, its resistance is such that it isolates the line load. For example, device 2 is a polymer bar charged with conductive particles. When the polymer expands, the conductive particles contained therein separate from one another, which opens the circuit formed by this protective bar.

In the case where the equipment to be protected is a user equipment with no independent electric power supply, it is not grounded and parallel protection device 3 is then connected between the two line input terminals 4 and 5, as illustrated in FIG. 1.

In the case where the equipment to be protected is provided with a ground connection, as is the case for example for a telephone exchange, the protection device described in relation with FIG. 1 is duplicated for each conductor of the telephone line.

An example of a protection system of this type is illustrated in FIG. 3. The equipment to be protected is, for example, a collective equipment (CE) 6 of telephone exchange type having a ground connection 7. Each conductor T, R of the twin-wire telephone line is then associated to a series protection device 2 (PTC). Further, each input terminal 4, 5 of equipment 6 is connected, by a protection device of parallel type 3, to ground 7.

A disadvantage of conventional protection devices such as discussed hereabove is that the current of a lasting disturbance (for example, a current induced by the vicinity of a conductor connected to the mains) may not be sufficient to trigger the protection device of series type but cause a heating of the parallel protection device 3.

Indeed, as shown in previously-described FIG. 2, a conventional parallel protection device only triggers when the voltage thereacross has reached its threshold voltage Vb0. However, before the brick-over point, in an area between a voltage Vbr and voltage Vb0, device 3 starts by an avalanche phase. Accordingly, if the current carrier by the line is in this intermediary range, the parallel protection device will dissipate power and risks being damaged.

Another disadvantage of the conventional protection system is that, on the collective equipment side, the telephone line must be balanced, that is, the equipment input series impedance must be the same on both line conductors. Now, the protection components with a positive temperature coefficient that are generally used, which have an idle series resistance on the order of 10 ohms, have a tolerance of ±20%. An imbalance between the protection devices of the two conductors alters the performances of the collective equipment.

Another disadvantage of the conventional solutions is that they are not integrable.

SUMMARY OF THE INVENTION

The present invention aims at providing a device for protecting an equipment connected to a line conveying an A.C. current, which can be triggered by temperature, that is, by a voltage condition that would cause heating of the equipment to be protected. The present invention more specifically aims at providing a new device, in series, for protection against lasting electric disturbances, which avoids any damage to the device placed in parallel for the protection against short disturbances.

The present invention more specifically aims at providing a series protection device that can be triggered by temperature and that is integrable.

The present invention also aims at providing a device that can be restarted, that it, allowing again the passing of current when the temperature of a selected circuit falls back under a predetermined threshold value.

To achieve these objects, the present invention provides a series device for protection against a heating of a parallel protection element of an equipment of a telephone line, including a bi-directional cut-off element, of normally on state and placed in series with the parallel protection element, a temperature detection element, a switching element adapted to turning off the cut-off element when the temperature detected by the detection element exceeds a predetermined threshold.

According to an embodiment of the present invention, the switching element is a normally-off bi-directional element.

According to an embodiment of the present invention, said cut-off element is formed of two cut-off thyristors assembled in antiparallel and each having a resistor connected between its two gates.

According to an embodiment of the present invention, said switching element is formed of two control thyristors, respectively a cathode-gate thyristor and an anode-gate thyristor, which are respectively associated with the anode and cathode gates of the cut-off thyristors.

According to an embodiment of the present invention, each thyristor of the switching element has its gate connected to a midpoint of a resistive dividing bridge having one of its resistive elements formed of a positive coefficient thermistor.

According to an embodiment of the present invention, each thyristor of the switching element has its gate connected to a midpoint of a resistive dividing bridge via a series association of diodes.

According to an embodiment of the present invention, a diode is interposed between the anode-gate control thyristor and the cathode gate of the cut-off thyristor with which it is associated.

According to an embodiment of the present invention, the device is made in the form of an integrated circuit. The temperature detection element is integrated in the same substrate as the parallel protection element. The temperature detection element detects the temperature of the parallel protection element.

The foregoing objects, features and advantages of the present invention, will be discussed in detail in the following non-limiting description of specific embodiments in connection with the accompanying drawings.

DETAILED DESCRIPTION OF THE DRAWINGS

Figure 1:
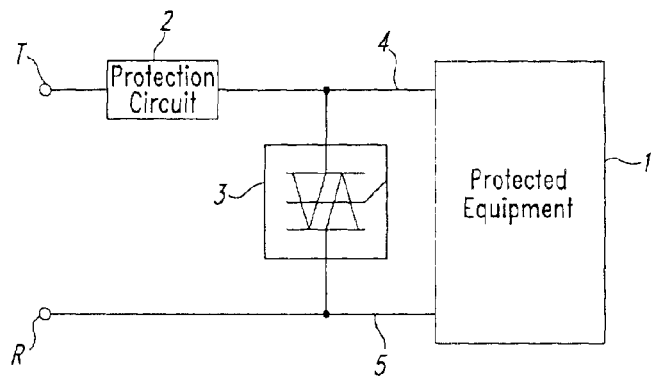
FIGS. 1 to 3, previously described, are intended for showing the state of the art and the problem to solve.
Figure 2:
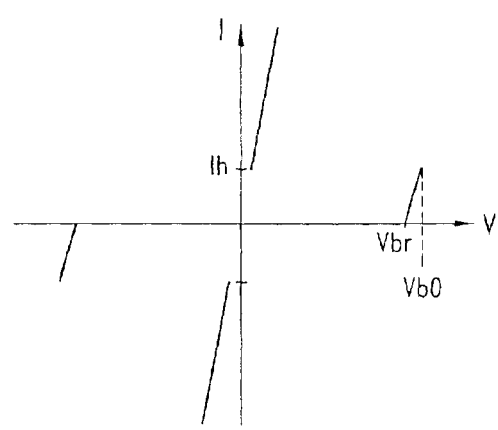

The same elements have been designated by the same references in the different drawings. For clarity, only those elements which are necessary to the understanding of the present invention have been shown in the drawings and will be described hereafter. In particular, the details constitutive of the equipment to be protected by a protection device of the present invention have not been mentioned, since they are well known.

A feature of the present invention is to provide a bi-directional cut-off element having a normally-on state, in series with a telephone line parallel protection element to be protected. A circuit for detecting the temperature of the parallel protection element is configured to turn off the cut-off element by means of an adapted control circuit. According to a preferred embodiment of the present invention, the control circuit is formed of a bi-directional switching element having a normally-off state.

Figure 4:
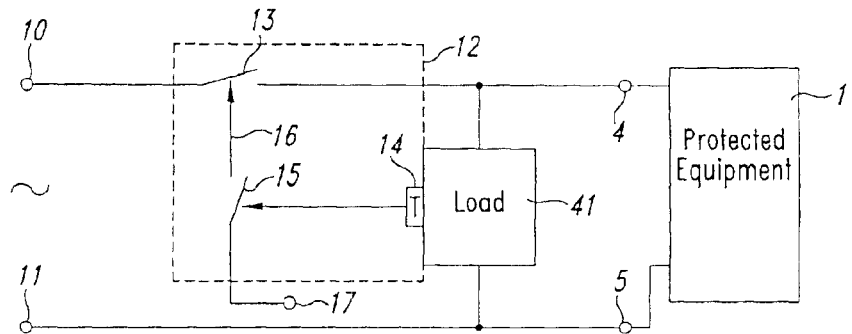
FIG. 4 schematically shows an embodiment of a protection device according to the present invention, associated with an equipment to be protected.

FIG. 4 schematically shows an embodiment of a series protection device 12 according to the present invention.

As previously, a load 41 to be protected, corresponding to a parallel protection element is supplied by an A.C. voltage applied between two terminals 10, 11. In the example of FIG. 4, it is assumed that other possible loads may be placed in parallel with load 41 downstream of terminals 10 and 11. For example, it may be a user equipment 1 connected between terminals 4 and 5. Load 41 to be protected may be a parallel protection circuit 3 of the type shown in FIG. 1.

Device 12 includes a cut-off element 13, connected in series with load 41 between terminals 10 and 11, and an element 14 for detecting the temperature of this load. Temperature (T) detection element 14 is, of course, placed as close as possible to the heat source to be detected, to be able to detect with as small an inertia as possible the temperature variations imposed thereto, in particular, by the A.C. current of the supply line. It should be noted that the temperature detection element detects the temperature of the load to be protected, , and not of its supply line.

Cut-off element 13 is a normally-on bi-directional switch intended to be turned off when the temperature sensed by element 14 exceeds a predetermined threshold. In the preferred embodiment illustrated in FIG. 4, cut-off element 13 is not directly controlled by detector 14 but rather by an intermediary switching element 15. Element 15 is also formed of a bi-directional switching system but, in this case, is normally off. The two power terminals of switching element 15 are connected, respectively, to a control terminal 16 of cut-off element 13 and to a terminal 17 of application of at least one substantially constant low control voltage. When the temperature sensed by element 14 exceeds the predetermined threshold value, the turning on of element 15 then turns off cut-off element 13 and disconnects load 41 to be protected from the A.C. power supply.

Among the constraints to be respected by the different components of a series protection device of the present invention, the breakdown voltage of cut-off element 13, its bi-directional character and, in the presence of switching element 15, the bi-directional character thereof will specifically be described.

Another feature of the present invention is that the cut-off element is automatically restartable, that is, it automatically turns back on when the sensed overheating disappears.

Figure 5:
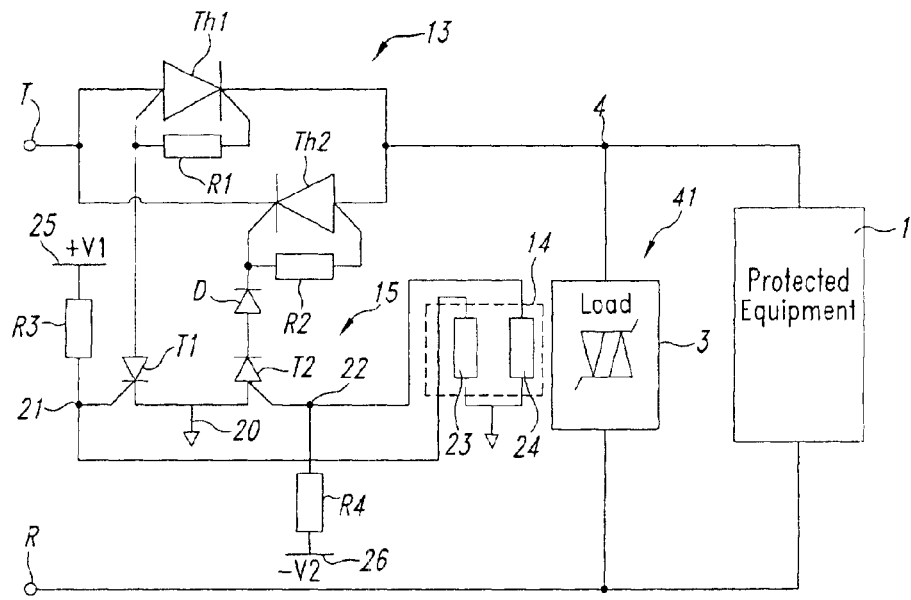
FIG. 5 shows an electric diagram of an embodiment of a protection device according to the present invention, applied to the protection of a telephone line.

FIG. 5 shows in further detail a preferred embodiment of a series protection device according to the present invention. The example of FIG. 5 is applied to the protection of a load itself formed of a parallel protection device. In this case, the diagram of FIG. 5 should be compared with that of FIG. 1 for protecting a user equipment (not shown in FIG. 5) connected to the end of a telephone line (conductors T and R). Parallel protection element 3 is unchanged with respect to the diagram of FIG. 1, except for the presence of a temperature detection element 14 according to the present invention. When the circuit is made in the form of an integrated circuit, temperature detection element 14 may be integrated with Trisil-type protection element 3.

Cut-off element 13 here is formed of two thyristors Th1 and Th2 mounted in antiparallel between terminals T and 4 of connection to the user equipment. The anode and cathode gates of each thyristor Th1, Th2 are, according to the present invention, connected by resistors R1 and R2, respectively. Resistors R1 and R2 enable placing thyristors Th1 and Th2 in a normally-on configuration, that is, in normal operation, as soon as a light current flows through the line, one of the thyristors (according to the direction of the current) turns on due to the biasing provided by the corresponding resistor R1 or R2.

Control stage 15 is, according to the preferred embodiment illustrated by FIG. 5, formed of two thyristors T1 and T2 respectively assigned to each of thyristors Th1 and Th2 of element 13. Thyristor T1 is connected, by its anode, to the anode gate of thyristor Th1 and, by its cathode, to a terminal at a reference potential, for example, the neutral point. It should be noted that it is not the ground. Indeed, in this application and as previously indicated, since the user equipment 1 is not grounded, the potential of terminal 20 is an arbitrarily null potential used as a neutral point by the user equipment 1.

Thyristor T2 is connected, by its anode, to terminal 20 and, by its cathode, to the cathode gate of thyristor Th2. It should be noted that this connection to the cathode gate of thyristor Th2 is performed via a protection diode D. The function of diode D is to avoid an untimely triggering of thyristor T2 during negative halfwaves of the normal operation phases and an untimely triggering of thyristor Th2 during positive halfwaves of the protection phases, as will be seen hereafter in relation with FIG. 7.

In the embodiment of FIG. 5, the gate of each thyristor T1, T2 is connected to the midpoint, respectively 21, 22, of a resistive dividing bridge formed of a series association of a fixed resistor, respectively R3, R4, and of a thermistor, respectively 23, 24.

It should be noted that thyristor T1 is a cathode-gate thyristor while thyristor T2 is an anode-gate thyristor. Accordingly, the series association of resistor R3 with thermistor 23 is connected between a terminal 25 of application of a substantially D.C. positive voltage +V1 and neutral point 20. The series association of resistor R4 with thermistor 24 is connected between a terminal 26 of application of a substantially D.C. negative voltage −V2 and neutral point 20.

In the embodiment of FIG. 5, thermistors 23 and 24 have a positive temperature coefficient, which is an advantage in terms of integration and availability of the product for sale. This is made possible by the fact of providing to turn on thyristors T1 and T2 to turn off cut-off circuit 13.

The operation of the protection device illustrated in FIG. 5 is the following.

In normal operation, that is, when the temperature of parallel protection circuit 3 corresponds to an acceptable temperature (for example, an ambient temperature ranging between −25° C. and +70° C.), thyristors T1 and T2 are permanently off. Accordingly, thyristors Th1 and Th2 respectively conduct for each halfwave of the line voltage and the series protection is inactive. The respective sizings of the components are chosen so that, upon positive halfwaves (considering that thyristor Th1 must conduct during positive halfwaves), the voltage of point 21 corresponding to the gate of thyristor T1 is smaller than the threshold triggering voltage of thyristor T1 (for example, 0.4 V). Accordingly, it is ensured that thyristor T1 is off, which enables turning on thyristor Th1 upon each positive halfwave as soon as a current runs through the line. It should be noted that a small current (for example, on the order of 1 milliampere) perfectly compatible with currents usually transiting over the line is sufficient.

It should also be noted that the implementation of the protection device of the present invention requires accepting a slight voltage drop (that across the cut-off element) in series with the load 41 to be protected. Here again, such a voltage drop on the order of one volt is perfectly compatible with an application to telephone lines.

For negative halfwaves, thyristor Th2 is turned on at the beginning of each halfwave since thyristor T2 remains off, the resistive bridge formed by resistor R4 and thermistor 24 being sized so that the voltage at point 22 remains smaller than the threshold voltage of thyristor T2.

When a short disturbance (for example, of lighting type) appears on the line, the protection device of the present invention does not intervene and parallel protection circuit 3 plays its role. Indeed, it detects the overvoltage without sufficiently heating up for the series protection of the present invention to open.

However, in the case of a relatively long disturbance (for example, a prolonged contact with the mains A.C. voltage at 50 or 60 Hz), parallel protection circuit 3 clips the overvoltage and thus protects the equipment connected across terminals 4 and 5. At the beginning of the disturbance, the series protection device of the present invention does not intervene since thyristors Th1 and Th2 are respectively on at each halfwave beginning of the disturbance. As soon as the temperature of circuit 3 rises, the respective values of thermistors 23 and 24 increase, which results in an increase of the voltage at point 21 and a decrease of the voltage at point 22. When this temperature reaches a predefined threshold (for example, on the order of from 150 to 200° C.), the voltages at points 21 and 22 become equal to the respective threshold voltages of thyristors T1 and T2. These thyristors thus turn on to pull to neutral point 20 the currents intended for being, respectively, injected into the gate of thyristor Th2 and extracted from the gate of thyristor Th1. Accordingly these thyristors can no longer start and cut-off element 13 remains off at each halfwave. Parallel protection circuit 3 then is disconnected from the line and, accordingly, protected. The temperature then decreases by the disappearing of the current in circuit 3. When the temperature falls back under the predefined threshold, the normal operation is resumed since thyristors T1 and T2 are off again. Two cases can then occur. Either the disturbance has disappeared and the system starts operating again in its normal state. Or the disturbance is still present and parallel protection circuit 3 will heat up again and reactivate the protection device of the present invention. It should be noted that the thermal inertia of the system avoids its oscillating.

It should also be noted that although the present invention requires two voltages, respectively a positive and a negative voltage, to properly bias thyristors T1 and T2 of the control circuit, providing these voltages generally raises no problem. In particular, said voltages are generally present in the telephone equipment to be protected.

Figure 3:
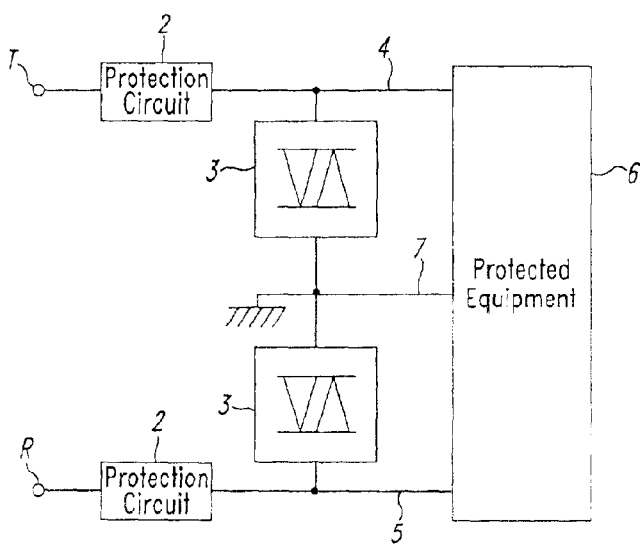

It should also be noted that the assemblies discussed in relation with FIGS. 4 and 5 are to be compared with those of FIG. 1 of prior art. For a protection on the collective equipment side in the application to telephony, an assembly equivalent to that of FIG. 3 is obtained by duplicating the assembly of FIG. 4 or 5, by being inspired by the transposition of the assembly of FIG. 1 to that of FIG. 3.

An advantage of the present invention is that it enables obtaining the series protection of a circuit element according to the temperature of this circuit element. In this case, in the application to telephony, this circuit element is itself a protection device.

Another advantage of the present invention is that the protection device that it provides is integrable.

From the above-described operation, it can be seen that the temperature detection element is, according to this embodiment of the present invention, displaced downstream of the line with respect to the conventional circuit where the series protection resistor (or fuse) is placed on the line. The present invention enables obtaining a better protection against all types of disturbances likely to occur on the line. In particular, there are no more risks of seeing a parallel protection element, and thus the equipment to be protected, damaged by a lasting disturbance since the series protection element here fully plays its role.

Figure 6:
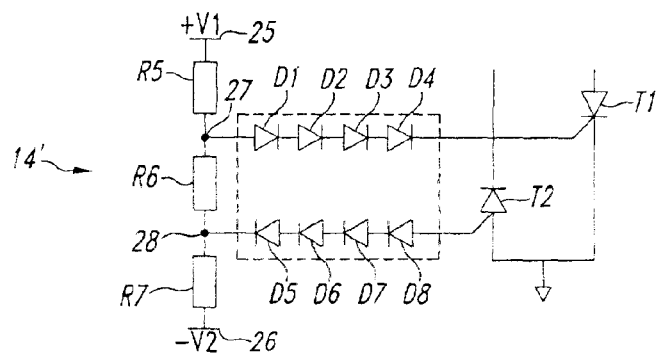
FIG. 6 shows an alternative embodiment of a temperature detector according to the present invention.

FIG. 6 shows another embodiment of a temperature detection element 14' likely to be used in the circuit of the present invention. According to this embodiment, the thermistors (23, 24, FIG. 5) are replaced with diodes in series, the voltage drop in these diodes varying according to their operating temperature. Of course, diodes such that the voltage across the series is included in the operating range of thyristor T2 will be chosen. In the example of FIG. 6, it is assumed that circuit 14' is formed, for thyristor T1, of four diodes D1, D2, D3, D4 in series. The cathode of diode D4 is connected to the gate of thyristor T1. The anode of diode D1 is connected to the midpoint 27 of a series association of resistors R5 and R6 in series between a terminal 25 of application of a voltage +V1 and a terminal 28. Terminal 28 is the junction point of resistor R6 and a resistor R7 between point 27 and a terminal 26 of application of a negative voltage −V2. Midpoint 28 is connected to the cathode of a first diode D5 of a series association of diodes D5, D6, D7, and D8 associated with thyristor T2, the anode of diode D8 being connected to the gate of thyristor T2. The rest of the circuit is the same as in FIG. 5.

In normal operation, the temperature of parallel protection circuit 3 corresponds to the desired operating ambient temperature (for example, ranging between −25° C. and +70° C.). For this temperature range, the voltage at point 27 is smaller than the voltage drop across the series of diodes D1 to D4 (respectively D5 to D8) plus the threshold voltage of thyristor T1. For negative halfwaves, the voltage at point 28 is smaller than the voltage drop across diodes D5 to D8 plus the threshold voltage of thyristor T2.

The voltage drop across the series of diodes D1 to D4 (respectively D5 to D8) decreases as the temperature of element 3 to be protected increases. When this decrease becomes such that the voltage of point 27 enables triggering thyristor T1, a current runs through its gate and turns it on to pull the current from resistor R1. The operation discussed in relation with FIG. 5 is thus found again.

Figure 7:
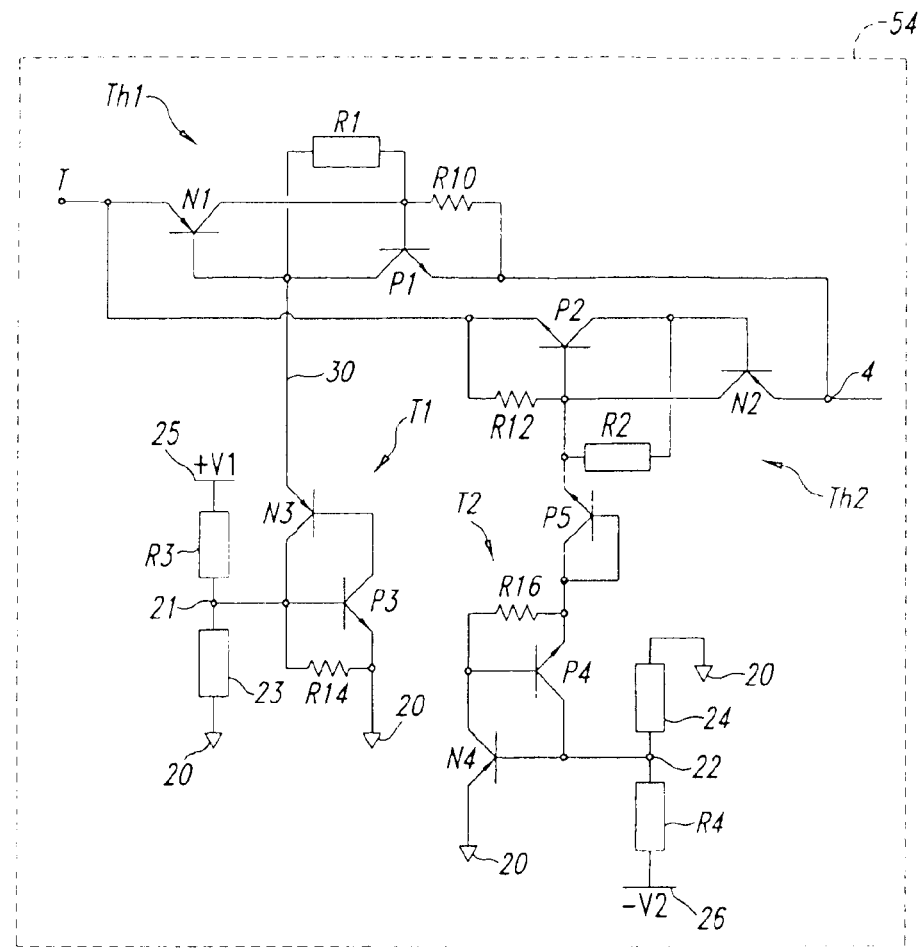
FIG. 7 is an equivalent electric diagram of an integrable protection device according to the present invention.

FIG. 7 shows the equivalent diagram, based on bipolar transistors, of a protection device such as illustrated in FIG. 5. FIG. 7 enables more precisely illustrating the operation of the circuit of the present invention and, more specifically, the function of diode D in series with thyristor T2. However, it should be noted that this is an equivalent diagram and that, in practice, the protection device of the present invention will preferentially be made in the form of an integrated circuit on a single semiconductor substrate 54 and bipolar transistors such as illustrated in FIG. 7 would then have common regions for the forming of a thyristor.

Thyristor Th1 is equivalent to a first PNP-type transistor N1, the emitter of which is connected to terminal T, the collector of which is connected, via an internal resistor R10, to terminal 4. The base of transistor N1 is connected to the collector of a second NPN-type transistor P1 having its emitter connected to terminal 4 and its base connected to the collector of transistor N1. The respective bases of transistors N1 and P1 form the anode and cathode gates between which is connected resistor R1.

Thyristor Th2 is equivalent to a first PNP-type transistor N2, the emitter of which is connected to terminal 4 and the collector of which is connected, via a resistor R12, to terminal T. The base of transistor N2 is connected to the collector of a second NPN-type transistor P2 having its emitter connected to terminal T and its base connected to the collector of transistor N2. The respective bases of transistors P2 and N2 form the cathode and anode gates connected to each other by resistor R2.

Thyristor T1 is equivalent to a first PNP-type transistor N3 having its emitter connected to anode gate 30 of thyristor Th1 and its collector connected, via a resistor R14, to neutral point 20. The base of transistor N3 is connected to the collector of a second NPN-type transistor P3 having its emitter connected to neutral point 20 and its base connected to the collector of transistor N3. It being a cathode-gate thyristor, the base of transistor P3 is connected to the midpoint 21 of the series association of resistor R3 with thermistor 23, between terminals 25 and 20, respectively of application of voltage +V1 and of neutral point.

Thyristor T2 is equivalent to a first PNP-type transistor N4 having its emitter connected to neutral point 20 and its collector connected, via a resistor R16, to the emitter of a second NPN-type transistor P4. The collector of transistor P4 is connected to the base of transistor N4 and its base is connected to the collector of transistor N4. It being an anode-gate thyristor, the base of transistor N4 is connected to the midpoint 22 of the series association of resistor R4 with thermistor 24, between terminals 26 and 20, respectively of application of voltage −V2 and of neutral point.

Diode D here is formed of an NPN-type transistor P5 having its emitter connected to the cathode-gate of thyristor Th2 (the base of transistor P2) and its collector connected to the cathode of thyristor T2 (the emitter of transistor P4). To be diode-mounted, transistor P5 has its collector connected to its base.

The presence of diode D (transistor P5) enables avoiding the untimely conduction of thyristor T2, more specifically, of transistor P4 by its base-collector junction.

It is assumed that the system operating temperature is such that thyristors T1 and T2 must remain off.

In the presence of a positive halfwave, a current flows through transistor N1 which is biased due to resistor R10 in series with resistor R1. From the beginning of the halfwave (more specifically as soon as the current flowing through resistor R1 becomes sufficient to turn on transistor P1), transistor P1 also conducts. As for thyristor T1, it is off since no base current can be taken from the base of transistor N3, transistor P3 being blocked by the biasing introduced by point 21. Accordingly, thyristor Th1 conducts. As for thyristor Th2, it is off since the base-emitter junction of transistor P2 is reverse-biased. Further, on the side of thyristor T2, the base-emitter junction of transistor P4 is reverse-biased, the voltage determined by point 22 blocking transistor N4.

During negative halfwaves, thyristor Th1 is off since the base-emitter junction of transistor N1 is reverse-biased. On the side of thyristor T1, the emitter of transistor N3 which is connected to terminal 4 via resistors R1 and R10 in series has its base-emitter junction reverse biased. Thyristor T1 is thus off (independently from the biasing of point 21). In the presence of diode D (transistor P5), thyristor T2 is on due to the biasing obtained by resistors R12 and R2.

It is now assumed that the operating temperature of the system is such that thyristors Th1 and Th2 must not trigger.

The voltages at points 21 and 22 are, by the sizing of the device, such that a base current can be, respectively, injected into transistor P3 and drawn from transistor N4. Thus, transistor N3 is turned on by the turning-on of transistor P3 and transistor P4 is turned on by the turning-on of transistor N4. Due to the position of resistor R16 (and thus to the fact that thyristor T2 is a cathode-gate thyristor), the above condition is only true if the base-emitter voltage of transistor P4 is sufficient, that is, especially if the potential of the emitter of transistor P4 does not risk exceeding the neutral point plus the voltage drop in resistor R16 and in transistor N4 in the on state. Now, in the absence of diode D (transistor P5), the presence of resistor R12 of thyristor Th2 can result in a greater voltage upon positive halfwaves. In the presence of diode D, said diode is reverse-biased upon positive halfwaves and the desired operating condition is fulfilled.

In the application of the present invention to the protection of user or collective equipment of telephone lines, supply voltages +V1 and −V2 generally are available on the interface cards or directly in the equipment.

Figure 8:
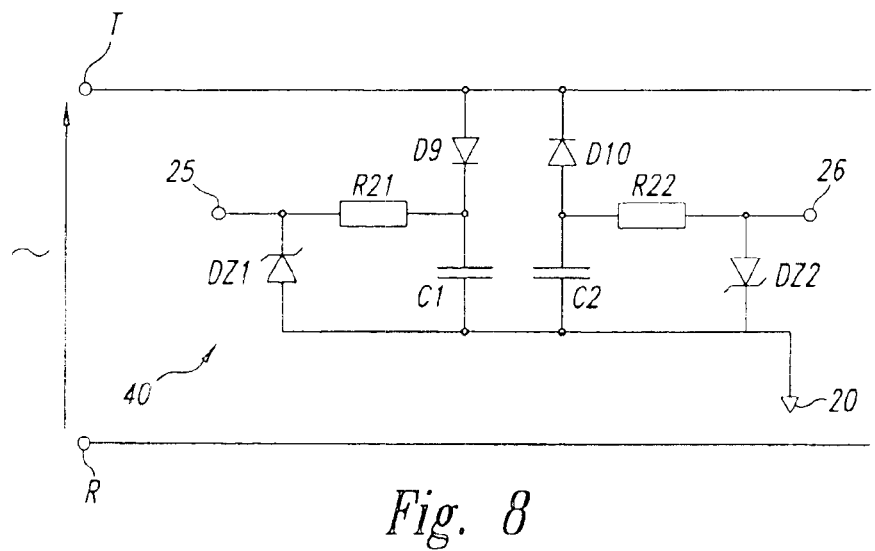
FIG. 8 shows an example of embodiment of a circuit for extracting positive and negative D.C. supply voltages from a protection device according to the present invention.

These supply voltages +V1 and −V2 could also be generated from the A.C. voltage, for example, by means of a circuit such as illustrated in FIG. 8. In the example of FIG. 8, the input terminals of application of the A.C. power supply have been referenced as T and R as in the case of a telephone line. A circuit 40 for generating biasing voltages +V1 and −V2 is based on the use of two capacitors C1, C2 each associated with one zener diode DZ1, DZ2. Zener diodes DZ1, DZ2 set the respective levels of voltages +V1 and −V2. The portion of circuit 40 used to generate positive voltage +V1 includes, from terminal T, a rectifying diode D9, the anode of which is connected to terminal T and the cathode of which is connected to a first electrode of capacitor C1. This first electrode is connected, via a resistor R21, to the cathode of zener diode DZ1 which is connected to terminal 25 of provision of voltage +V1. The anode of zener diode DZ1 is connected to the second electrode of capacitor C1 and to neutral point 20. On the negative voltage side, voltage V2 is sampled from terminal 26 corresponding to the anode of diode DZ2. A rectifying diode D10 is connected by its cathode to terminal T. The anode of diode D10 is connected to a first electrode of a capacitor C2, the second electrode of which is connected to terminal 20 and to the cathode of diode DZ2. The first electrode of capacitor C2 and the anode of diode DZ2 are connected to each other by a resistor R22.

The generation circuit of FIG. 8 is a relatively simple means for obtaining two respectively positive and negative voltages used for the operation of the protection device of the present invention. However, it should be noted that other more or less complex generation circuits may be used as an alternative.

It should be noted that the use of a double-biasing D.C. power supply is made necessary by anode-gate thyristor T1 from which current must be drawn.

Of course, the present invention is likely to have various alterations, modifications, and improvements which will readily occur to those skilled in the art. In particular, although the present invention has been more specifically described hereabove in relation with an application to the protection of telephone lines, the present invention may find other applications. This application however is a preferred application due to the significant advantages that it provides by protecting a parallel protection circuit.

Further, the respective sizings of the different components of a protection device of the present invention are within the abilities of those skilled in the art based on the functional indications given hereabove and on the desired temperature and voltage operating ranges.

Finally, it should be noted that other temperature detection elements may be used, provided, in the preferred embodiment of the present invention, that said detection elements generate a voltage variation corresponding to that of a resistor with a positive coefficient.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A series device of protection against a heating of a parallel protection element of an equipment of a telephone line, including:
   a bidirectional cut-off element of normally on state, in series with the parallel protection element;
   a temperature detection element adjacent to the parallel protection element; and
   a switching element having an input coupled to an output of the detection element and adapted to turn off the cut-off element when the temperature of the parallel protective element detected by the detection element exceeds a predetermined threshold.

2. The device of claim 1, wherein the switching element is a normally-off bidirectional element.

3. The protection device of claim 1, wherein said cut-off element includes two cut-off thyristors assembled in anti-parallel and each having a resistor connected between its anode and cathode gates.

4. The protection device of claim 3, wherein said switching element includes two control thyristors, respectively a cathode-gate thyristor and an anode-gate thyristor, which are respectively associated with the anode and cathode gates of the cut-off thyristors.

5. The protection device of claim 4, wherein each control thyristor of the switching element has its gate connected to a midpoint of a resistive dividing bridge having one of its resistive elements formed oh positive coefficient thermistor.

6. The protection device of claim 4, wherein each control thyristor of the switching element has its gate connected to a midpoint of a resistive dividing bridge via respective series connection of diodes.

7. The protection device or claim 4, wherein a diode is interposed between the anode-gate control thyristor and the cathode gate of the cut-off thyristor with which it is associated.

8. The protection device of claim 1, further including a single semiconductor substrate having the bidirectional cut-off element, the temperature detection element, and the switching element integral formed thereon.

9. The protection device of claim 1, wherein the temperature detection element detects the temperature of the parallel protection element.

10. The protection device of claim 1, wherein the temperature detection element is integrated in the same semiconductor substrate as the parallel protection element.

11. A protection circuit comprising:

a protection element;

a cut-off circuit in a normally on state, in series with a main power to the protection element;

a temperature detection element positioned adjacent to the protection element; and a normally-off switching element coupled to the temperature detection element to receive a signal when a temperature sensed by the temperature detection circuit is above a threshold value, the switching element being structured to turn on in response to the signal and output a signal to the cut-off circuit which turns off the cut-off circuit and disconnects the main power from the protection element.

12. A series protection device comprising:

a bidirectional cut-off element that is normally in an on state, the bidirectional cut-off element including two cut-off thyristors assembled in antiparallel, each having a resistor connected between its anode and cathode gates;

a protection element in series with the bidirectional cut-off element;

a temperature detection element adjacent to the parallel protection element; and a switching element adapted to turning off the cut-off element when the temperature of the protection element as detected by the temperature detection element exceeds a predetermined threshold, the switching element including two control thyristors, respectively a cathode-gate thyristor and an anode-gate thyristor which are respectively associated with the anode and cathode-gates of the cut-off thyristors and further including a diode positioned between the anode-gate control thyristor and the cathode-gate of the cut-off thyristor with which it is associated.

13. A protection device for protecting equipment, comprising:

a parallel protection element in parallel with the equipment;

a bidirectional cut-off element of normally on state, coupled to the protection element, and including first and second cut-off thyristors assembled in antiparallel, each of the cut-off thyristors having a control terminal;

a temperature detection element adjacent to the parallel protection element; and a switching element adapted to turn off the cut-off element when the temperature of the parallel protective element detected by the detection element exceeds a predetermined threshold, wherein the switching element includes first and second control thyristors that are respectively connected between the detection element and the control terminals of the first and second cut-off thyristors.

14. The protection device of claim 13, wherein each control thyristor of the switching element has a control terminal, the detection element includes first and second thermistors connected to each other, and the switching element further includes a first resistor connected at a first intermediate node to the control terminal of the first control thyristor and the first thermistor and a second resistor connected at a second intermediate node to the control terminal of the second control thyristor and the second thermistor.

15. The protection device of claim 13, wherein each control thyristor of the switching element has a control terminal and the detection element includes:

a resistive divider connected between first and second voltages and including first and second intermediate nodes;

a first series connection of diodes connected between the first intermediate node and the control terminal of the first control thyristor; and a second series connection of diodes connected between the second intermediate node and the control terminal of the second control thyristor.

16. The protection device of claim 13, wherein the switching element further includes a diode interposed between the first control thyristor and the control terminal of the first cut-off thyristor.

17. The protection device of claim 13, wherein the control terminal of the first cut-off thyristor is an anode-gate and the control terminal of the second cut-off thyristor is a cathode-gate.

18. The protection device of claim 13 wherein the cut-off element further includes a first resistor connected between an anode-gate and a cathode-gate of the first cut-off thyristor, and a second resistor connected between an anode-gate and a cathode-gate of the second cut-off thyristor, wherein the control terminal of the first cut-off thyristor is one of the anode- and cathode-gates of the first cut-off thyristor, and the control terminal of the second cut-off thyristor is one of the anode- and cathode-gates of the second cut-off thyristor.

19. The protection device of claim 13 wherein the first control thyristor is a cathode-gate thyristor and the second control thyristor is an anode-gate thyristor.

* * * * *

UNITED STATES PATENT AND TRADEMARK OFFICE
CERTIFICATE OF CORRECTION

PATENT NO.   : 6,850,400 B2
DATED        : February 1, 2005
INVENTOR(S)  : Andre Bremond et al.

It is certified that error appears in the above-identified patent and that said Letters Patent is hereby corrected as shown below:

Column 10,
Line 59, "resistive elements formed oh positive coefficient thermistor." should read as -- resistive elements formed of a positive coefficient thermistor. --

Signed and Sealed this

Twelfth Day of July, 2005

JON W. DUDAS
*Director of the United States Patent and Trademark Office*